United States Patent
Yoshihara (10) Patent No.: US 9,389,814 B2
(45) Date of Patent: Jul. 12, 2016

(54) SERVER APPARATUS, PRINTING SYSTEM, INFORMATION PROCESSING METHOD, AND PROGRAM

(71) Applicant: CANON KABUSHIKI KAISHA, Tokyo (JP)

(72) Inventor: Toshio Yoshihara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/680,772

(22) Filed: Apr. 7, 2015

(65) Prior Publication Data

US 2015/0293725 A1    Oct. 15, 2015

(30) Foreign Application Priority Data

Apr. 9, 2014  (JP) .................................. 2014-080428

(51) Int. Cl.
*G06F 3/12* (2006.01)

(52) U.S. Cl.
CPC .............. *G06F 3/1222* (2013.01); *G06F 3/126* (2013.01); *G06F 3/1238* (2013.01); *G06F 3/1288* (2013.01); *G06F 3/1292* (2013.01)

(58) Field of Classification Search
USPC ...................................................... 358/1.15
See application file for complete search history.

(56) References Cited

U.S. PATENT DOCUMENTS

| 2007/0244963 | A1* | 10/2007 | Hibino | G06F 21/608 709/201 |
| 2014/0104635 | A1* | 4/2014 | Nishikawa | H04N 1/00238 358/1.14 |
| 2014/0132982 | A1* | 5/2014 | Neville | G06F 3/1204 358/1.15 |
| 2014/0211246 | A1* | 7/2014 | Okuno | G06K 15/007 358/1.15 |

FOREIGN PATENT DOCUMENTS

| EP | 1120273 | * | 8/2001 |
| JP | 2007-203735 A | | 8/2007 |

* cited by examiner

*Primary Examiner* — Ngon Nguyen
(74) *Attorney, Agent, or Firm* — Canon USA, Inc., IP Division

(57) ABSTRACT

A server apparatus includes an acquisition unit that acquires distance information between a printing device and a portable terminal device based on positional information of the printing device and positional information of the portable terminal device, and a control unit that controls printing of print data by the printing device based on the distance information. The server apparatus increases the security of a printed material left unattended without causing a user any trouble.

8 Claims, 11 Drawing Sheets

| CURRENT POSITION INFORMATION | | | |
|---|---|---|---|
| USER ID | POSITIONAL INFORMATION | | |
| | LATITUDE | LONGITUDE | ALTITUDE (FLOOR NUMBER) |
| A012345 | xxx | yyy | zzz |

FIG.5B

| USER MANAGEMENT TABLE | | | | |
|---|---|---|---|---|
| USER ID | CURRENT POSITION INFORMATION | | | PRINT DATA |
| | LATITUDE | LONGITUDE | ALTITUDE (FLOOR NUMBER) | |
| A012345 | xxx | yyy | zzz | aaaaa.pdf |

FIG.5C

| PRINT POSITION INFORMATION TABLE | | | | |
|---|---|---|---|---|
| PRINTER NAME | IP ADDRESS | POSITIONAL INFORMATION | | |
| | | LATITUDE | LONGITUDE | ALTITUDE (FLOOR NUMBER) |
| PRINTER 103 | nnn. nnn. nnn. nnn | xxx | yyy | zzz |
| PRINTER 104 | nnn. nnn. nnn. nnn | xxx | yyy | zzz |
| PRINTER 105 | nnn. nnn. nnn. nnn | xxx | yyy | zzz |
| ... | ... | ... | ... | ... |

FIG. 6

| FIG.6A |
| FIG.6B |
| FIG.6C |

SERVER APPARATUS, PRINTING SYSTEM, INFORMATION PROCESSING METHOD, AND PROGRAM

BACKGROUND

1. Field

Aspects of the present invention generally relate to a server apparatus, a printing system, an information processing method, and a program that can increase the security of a printed material left unattended without causing a user any trouble.

2. Description of the Related Art

As a result of the spread of mobile terminals, print data is now frequently being transmitted from a mobile terminal. A mobile terminal can obtain its positional information through the Global Positioning System (GPS) or the like. Although the GPS has still a problem with its accuracy, it is anticipated that, by using an assist function for improving the positional accuracy through a Wi-Fi® function or improving the indoor GPS infrastructure, the GPS will become capable of detecting the position with high accuracy even inside a building.

In the meantime, a pull printing system is being installed in an increasing number of offices to prevent printed materials from being left unattended. In the pull printing system, a client terminal first transmits print data to a print server on a network, and the print data is stored in the print server. Then, a printer on the network authenticates a user based on an operation by the user. When the user is successfully authenticated, the printer receives the stored print data and executes printing.

Japanese Patent Application Laid-Open No. 2007-203735 discusses the following technique. If a user carries out an operation to interrupt printing while the printing is being executed, the printing being executed is interrupted. The printing resumes if the user carries out another authentication operation when the printing is to resume.

While Japanese Patent Application Laid-Open No. 2007-203735 presumes a case in which printing is interrupted while being executed, it does not refer to a case in which a user waits for a job output while another job is being executed. In such a case, if the other job being executed is a job that takes time, the user has to spend time waiting at the printer. If the job is output while the user is away from the printer, a security issue arises. In other words, from a security standpoint, when the user moves away from the printer, the job output needs to be stopped before the job is output. In addition, the technique discussed in Japanese Patent Application Laid-Open No. 2007-203735 includes the need for the user to carry out an operation to interrupt printing, which consumes the user's time. Furthermore, a user operation is necessary also in the case where the user cancels a job when execution of another job takes much time.

SUMMARY

Aspects of the present invention are generally directed to increasing the security of a printed material left unattended without causing a user any trouble.

According to an aspect of the present invention, a server apparatus includes an acquisition unit configured to acquire distance information between a printing device and a portable terminal device based on positional information of the printing device and positional information of the portable terminal device, and a control unit configured to control printing of print data by the printing device based on the distance information.

Further features of the present disclosure will become apparent from the following description of exemplary embodiments with reference to the attached drawings.

BRIEF DESCRIPTION OF THE DRAWINGS

FIG. 6 (including FIGS. 6A, 6B, and 6C) is a flowchart illustrating exemplary information processing according to a second exemplary embodiment.

DESCRIPTION OF THE EMBODIMENTS (System Configuration)

Figure 1:
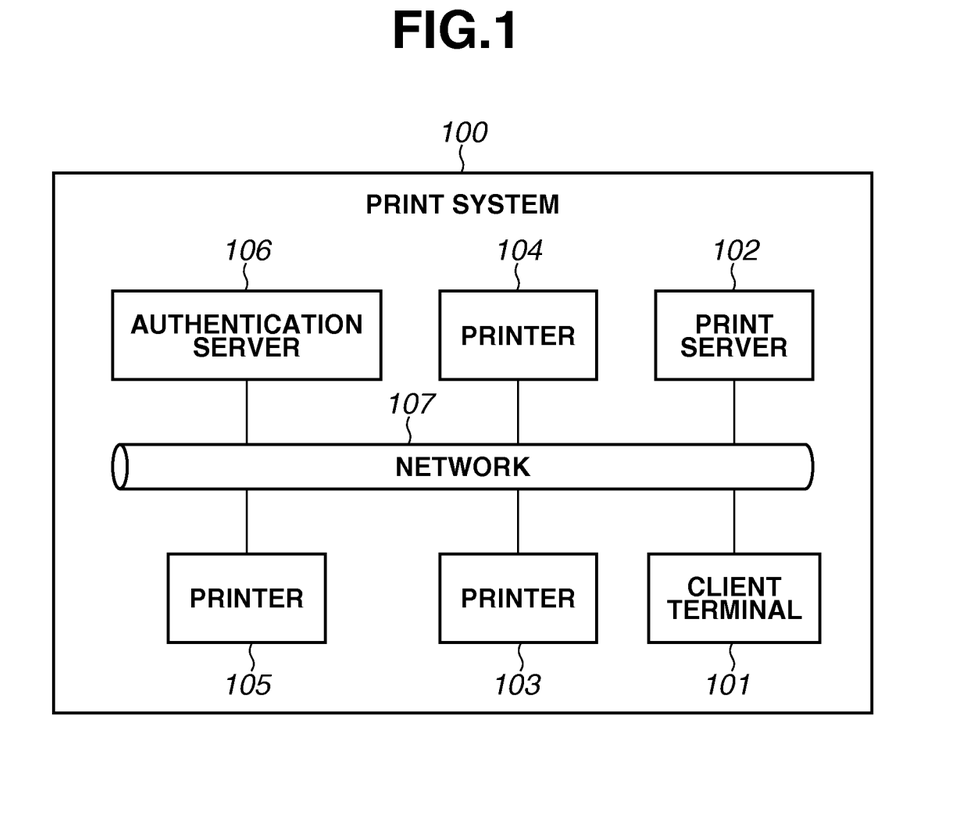
FIG. 1 illustrates an exemplary system configuration of a printing system.

Hereinafter, a first exemplary embodiment will be described. FIG. 1 illustrates an exemplary system configuration of a printing system 100. Devices constituting the printing system 100 are interconnected through a network 107. Each device may be connected to the network 107 through a wired local area network (LAN), a wireless LAN, or the like.

A client terminal 101 is an electronic device, such as a laptop computer, a tablet personal computer (PC), and a smartphone. The client terminal 101 is an example of a portable terminal device.

A print server 102 receives print data transmitted from the client terminal 101 and stores the print data. Further, the print server 102 transmits print data to printers 103, 104, and 105.

The printers 103, 104, and 105 can connect to the network 107. The printers 103, 104, and 105 each receive print data transmitted from the print server 102 and print the print data on a print medium or the like.

An authentication server 106 is a server for providing a single sign-on environment in the printing system 100, and stores user management information and so on for user authentication.

(Hardware Configuration of Client Terminal)

Figure 2A:
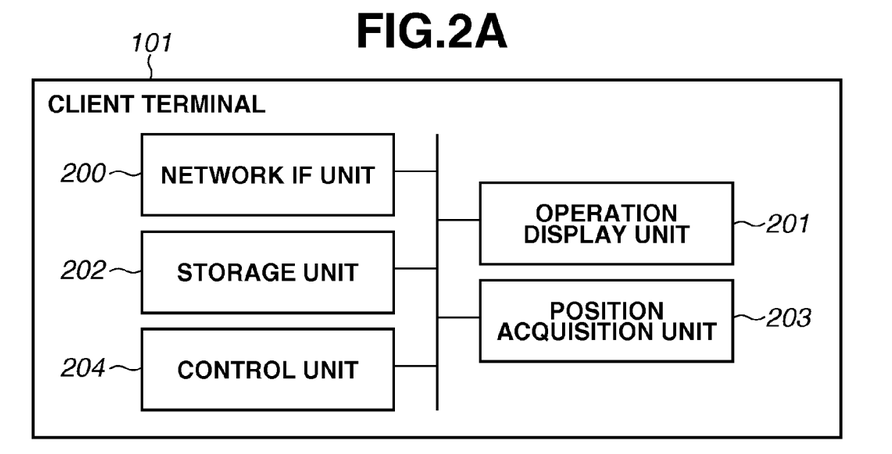
FIGS. 2A, 2B, and 2C illustrate exemplary hardware configurations of a client terminal, a print server, and a printer, respectively.

FIG. 2A illustrates an exemplary hardware configuration of the client terminal 101.

A network interface (IF) unit 200 is an interface that supports a wireless LAN based on the IEEE 802.11g, IEEE 802.11b, or IEEE 802.11a standard or the like, and exchanges data with an external apparatus through the wireless LAN. Alternatively, the network IF unit 200 may be an interface that supports a wired LAN.

An operation display unit 201 is a device, such as a touch panel, that is provided with a display function and an operation function, and functions as a user interface for the client terminal 101. Alternatively, the operation display unit 201 may be constituted by a combination of a liquid crystal display and hardware keys. A storage unit 202 is a storage device, such as a hard disk and a flash memory, and stores image data, print data, and so on. The storage unit 202 also functions as an auxiliary storage device for a control unit 204.

A position acquisition unit 203 has a function of detecting a current position of the client terminal 101. The position acquisition unit 203, for example, includes an antenna that receives a GPS signal and a GPS signal processing unit that calculates positional information from a received GPS signal. The position acquisition unit 203 may further include an indoor messaging system (IMES) signal processing unit that receives an IMES signal through the antenna and calculates position information from the received IMES signal. The position acquisition unit 203 may be implemented by a Wi-Fi® positional information processing unit that calculates current positional information from the radio wave intensity of the wireless LAN received from the network IF unit 200.

The control unit 204 is a central processing unit for controlling the client terminal 101.

A specific example of the client terminal 101 is a mobile terminal such as a smartphone and a tablet.

The control unit 204 executes processes based on a program stored in the storage unit 202 or the like, and the functions of the client terminal 101 and the processes of the client terminal 101 indicated in the flowcharts are implemented accordingly.

(Hardware Configuration of Print Server)

Figure 2B:
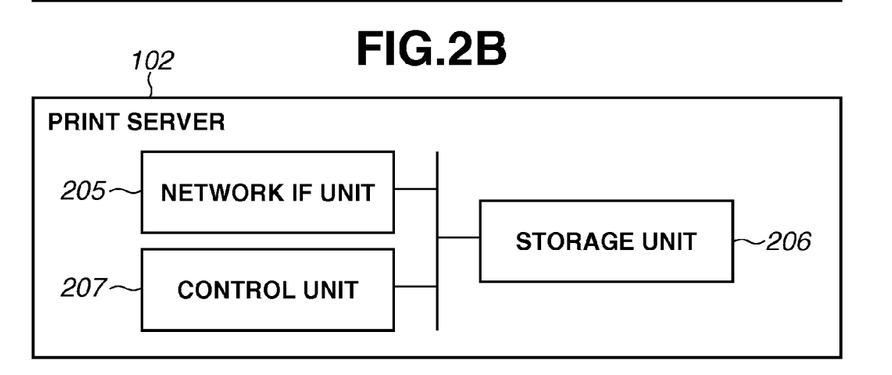

FIG. 2B illustrates an exemplary hardware configuration of the print server 102.

A network IF unit 205 is an interface that supports a wired LAN based on Gigabit Ethernet (registered trademark) or the like, and exchanges data with an external apparatus through the wired LAN.

A storage unit 206 is a storage device such as a hard disk and a solid state drive (SSD), and stores print data and so on. The storage unit 206 also functions as an auxiliary storage device for a control unit 207.

The control unit 207 is a central processing unit for controlling the print server 102.

The control unit 207 executes processes based on a program stored in the storage unit 206 or the like, and the functions of the print server 102 and the processes of the print server 102 indicated in the flowcharts are implemented accordingly.

(Configuration of Printer)

Figure 2C:
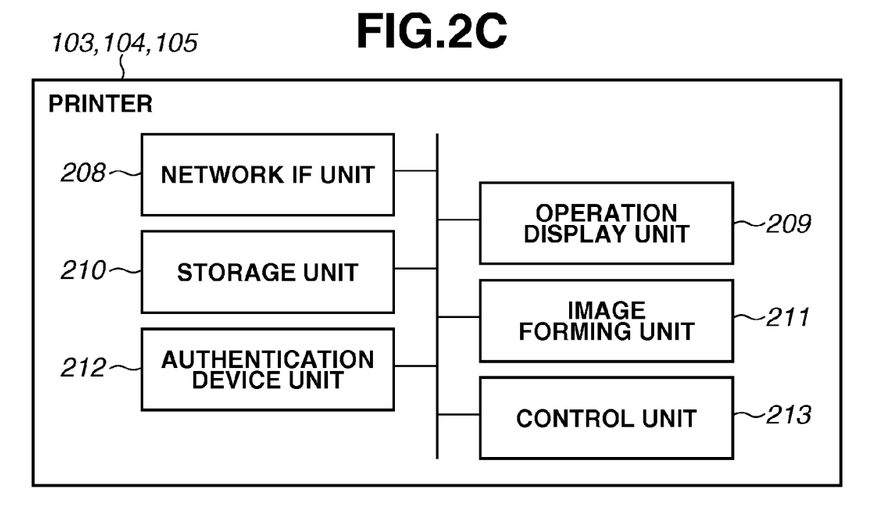

FIG. 2C illustrates an exemplary hardware configuration of the printer 103, 104, or 105.

A network IF unit 208 is an interface that supports a wired LAN based on Gigabit Ethernet or the like, and exchanges data with an external apparatus through the wired LAN. Alternatively, the network IF unit 208 may be an interface that supports a wireless LAN.

An operation display unit 209 is a device such as a touch panel, that is provided with a display function and an operation function, and functions as a user interface for the printer 103, 104, or 105. Alternatively, the operation display unit 209 may be constituted by a combination of a liquid crystal display and hardware keys.

A storage unit 210 is a storage device such as a hard disk and an SSD, and stores print data and so on. The storage unit 210 also functions as an auxiliary storage device for a control unit 213.

An image forming unit 211 includes a device that forms an image on a print medium based on print data. In the case of a laser printer, for example, the image forming unit 211 includes a paper conveyance device, a photosensitive drum, a fixing unit, and so on.

An authentication device unit 212 includes an integrated circuit (IC) card reader and functions along with the operation display unit 209 as a device for user authentication.

The control unit 213 is a central processing unit for controlling the printer 103, 104, or 105.

The control unit 213 executes processes based on a program stored in the storage unit 210 or the like, and the functions of the printers 103, 104, and 105 and the processes of the printers 103, 104, and 105 indicated in the flowcharts are implemented accordingly.

(Information Processing for Controlling Print Execution based on Positional Information)

Figure 3:
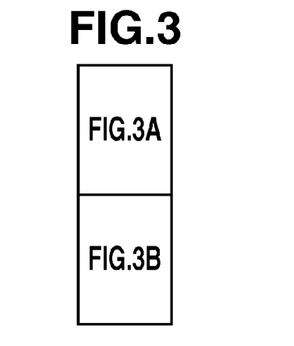
FIG. 3 (including FIGS. 3A and 3B) is a flowchart illustrating exemplary information processing according to a first exemplary embodiment.
Figure 3A:
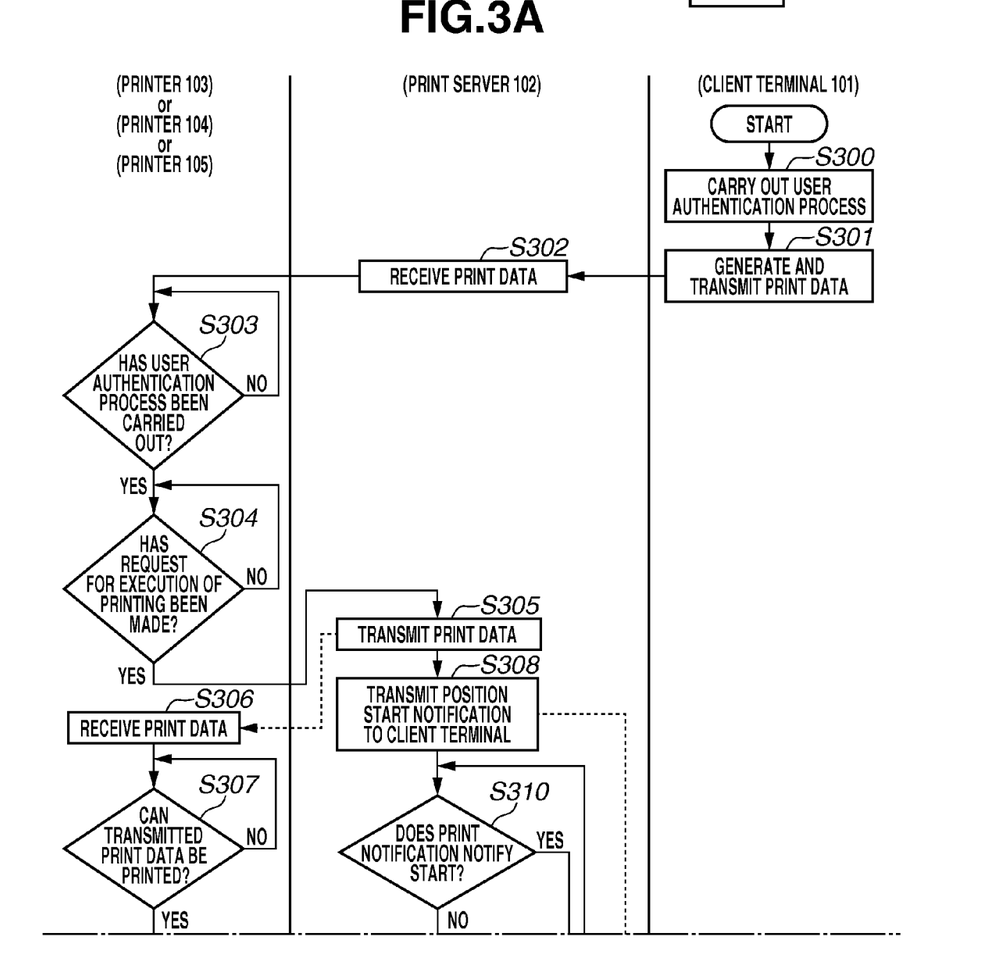
Figure 3B:
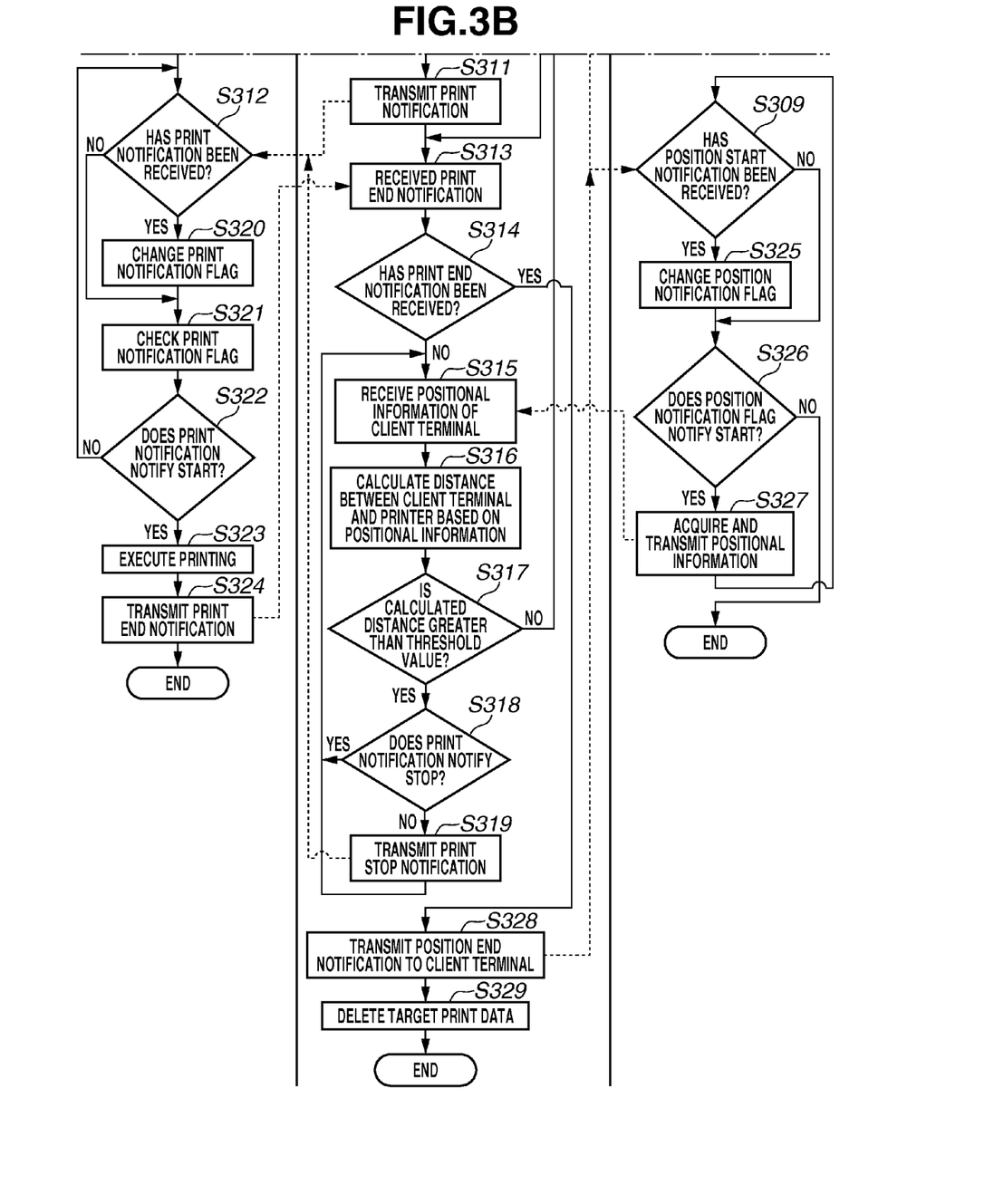

FIG. 3 is a flowchart illustrating exemplary information processing for controlling print execution based on positional information.

In step S300, the control unit 204 of the client terminal 101 requests a user ID and a password from a user who uses the printing system 100. This process may be executed when the client terminal 101 is started, or when pull printing is executed. Based on the input user ID and password, the control unit 204 requests authentication from the authentication server 106. The authentication server 106 is equipped with an authentication service that provides a single sign-on environment. In the present exemplary embodiment, Kerberos authentication, for example, is used. The client terminal 101 receives, as input, a user ID and a password from the user through the operation display unit 201. The control unit 204 then encrypts the user ID and the password input by the user, and transmits the encrypted user ID and password to the authentication server 106. Upon receiving the encrypted user ID and password from the client terminal 101, the authentication server 106 verifies the received data against the user management information stored in advance in the authentication server 106. If the authentication server 106 confirms that the user is a valid user, the authentication server 106 transfers a ticket granting ticket (TGT) to the client terminal 101. The client terminal 101 then transmits the TGT to the authentication server 106 and requests access to the print server 102. Upon confirming the TGT, the authentication server 106 transmits, to the client terminal 101, a service ticket (ST) that allows the client terminal 101 to access the print server 102. The client terminal 101 presents the received ST to the print server 102. Through this process, the client terminal 101 can access the print server 102.

In step S301, the control unit 204 of the client terminal 101 generates print data and transmits the generated print data to the print server 102. The print data to be transmitted at this point includes the user ID serving as attribute information; and the print server 102, for example, can associate the print data with the client terminal 101 based on the user ID. The client terminal 101, the print server 102, and the printers 103, 104, and 105 exchange data among them through the network IF units 200, 205, and 208. In the present exemplary embodiment, a network IF may be a LAN.

In step S302, the control unit 207 of the print server 102 stores the received print data into the storage unit 206 of the print server 102.

In step S303, the control unit 213 of any of the printers 103, 104, and 105 determines whether the user has carried out the authentication process. In the description of the flowchart, any of the printers 103, 104, and 105 may be selected, and for the sake of simplicity, the following description is based on the printer 103 as being selected. In the authentication process, the control unit 213 of the printer 103 determines that the authentication has succeeded when the user ID of the print data stored in the storage unit 206 coincides with the user ID authenticated by the authentication device unit 212 of the printer 103 (YES in step S303).

Figure 4:
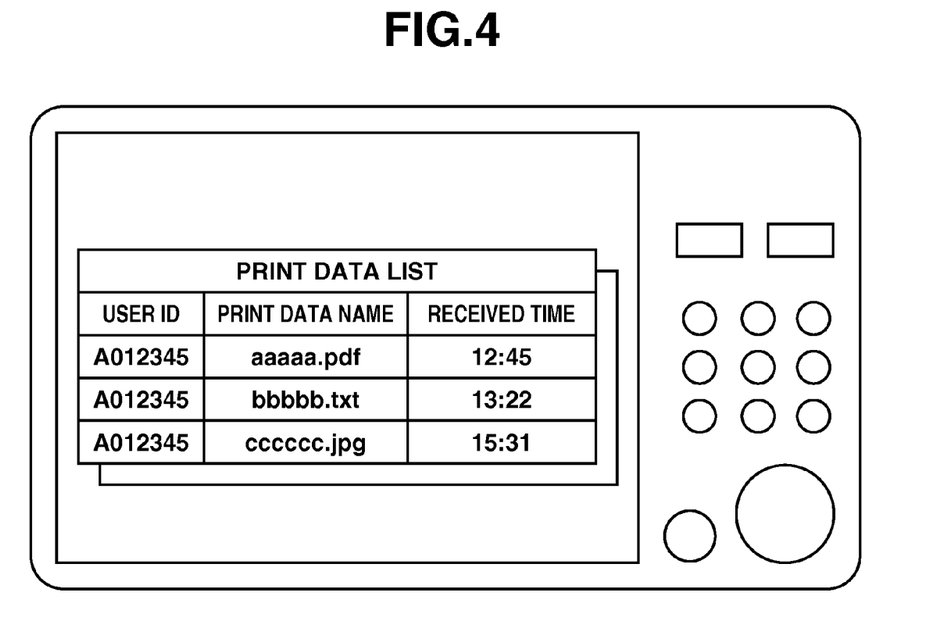
FIG. 4 illustrates an exemplary screen to be displayed in an operation display unit of a printer.

In step S304, the control unit 213 of the printer 103 determines whether print execution has been requested based on the user operation of the operation display unit 209 of the printer 103. FIG. 4 illustrates an exemplary screen to be displayed in the operation display unit 209 at this point. The user selects print data (job) to be printed from a job list illustrated in FIG. 4 to instruct the print execution. If the control unit 213 of the printer 103 determines that the print execution has been requested (YES in step S304), the control unit 213 requests the selected print data from the print server 102.

In step S305, the control unit 207 of the print server 102 transmits, to the printer 103, the print data corresponding to the print request selected in step S304.

In step S306, the control unit 213 of the printer 103 receives the print data transmitted from the print server 102 and stores the received print data into the storage unit 210 of the printer 103.

In step S307, the control unit 213 of the printer 103 determines whether the print data received in step S306 can be printed. For example, the control unit 213 of the printer 103 determines that the print data cannot be printed if another job is being executed.

In step S308, the control unit 207 of the print server 102 transmits a position start notification to the client terminal 101.

In step S309, the control unit 204 of the client terminal 101 determines whether the control unit 204 has received the position start notification transmitted from the print server 102. If the control unit 204 of the client terminal 101 has received the position start notification (YES in step S309), the control unit 204 proceeds to step S325; and if the control unit 204 has not received the position start notification (NO in step S309), the control unit 204 proceeds to step S326.

In step S310, the control unit 207 of the print server 102 determines whether a notification of print start has been received. The control unit 207 determines whether the notification of the print start has been received based on a flag for the print notification stored in the storage unit 206 of the print server 102. The control unit 207 selects between a start and a stop based on the data transmitted to the printer 103 and sets a flag accordingly. The control unit 207 of the print server 102 transmits, to the printer 103, a print notification corresponding to the flag for the print notification, and can thus control the start and the stop of print execution. The initial value of the flag for the print notification (print notification flag) is stop. In other words, when the control unit 207 of the print server 102 carries out the process in the step S310 of this flowchart for the first time, the control unit 207 proceeds to step S311, and transmits a print notification (notification of the print start) to the printer 103.

In step S311, the control unit 207 of the print server 102 transmits a print notification (notification of the print start) to the printer 103. In addition, the control unit 207 changes the flag for the print notification stored in the storage unit 206 of the print server 102 to start.

In step S312, the control unit 213 of the printer 103 determines whether the control unit 213 has received the print notification (notification of the print start) transmitted from the print server 102. If the control unit 213 has received the print notification (YES in step S312), the control unit 213 proceeds to step S320; and if the control unit 213 has not received the print notification (NO in step S312), the control unit 213 proceeds to step S321.

In step S313, the control unit 207 of the print server 102 receives a print end notification transmitted from the printer 103. This process is executed only when a print end notification is transmitted from the printer 103. In other words, in a case in which a print end notification is not transmitted from the printer 103, the control unit 207 proceeds from the process in step S311 to the process in step S314. If the control unit 207 has received the print end notification, the control unit 207 sets a print end flag stored in the storage unit 206 of the print server 102 to ON based on the received print end notification. The initial value of the print end flag is OFF. In this manner, the control unit 207 determines that the print execution that is based on the positional information has ended based on the state of the print end flag stored in the storage unit 206.

In step S314, the control unit 207 of the print server 102 determines whether the control unit 207 has received the print end notification. Specifically, the control unit 207 checks the print end flag stored in the storage unit 206 of the print server 102. If the flag is ON (YES in step S314), the control unit 207 proceeds to step S328; and if the flag is OFF (NO in step S314), the control unit 207 proceeds to step S315.

Figure 5A:
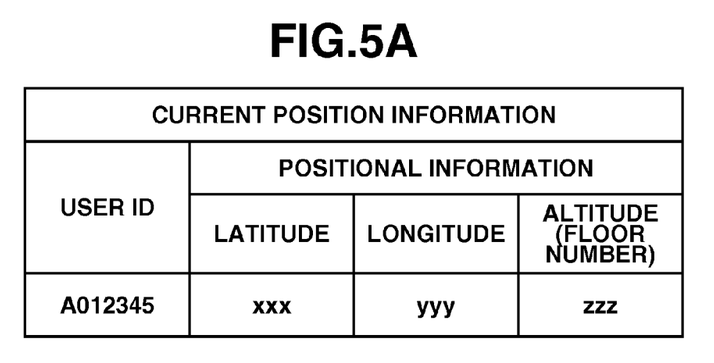
FIGS. 5A, 5B, and 5C illustrate examples of data.
Figure 5B:
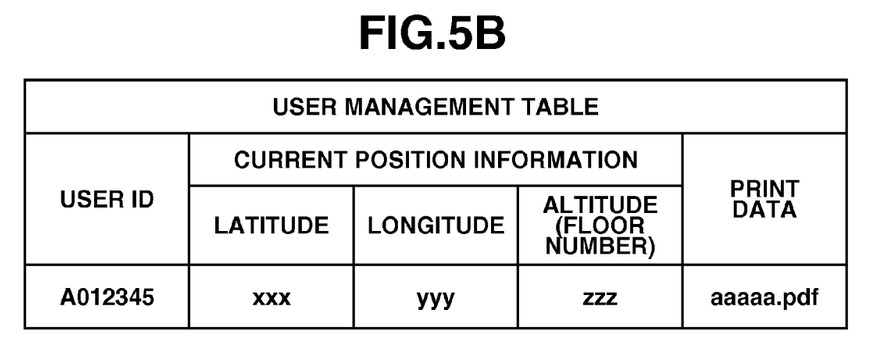

In step S315, the control unit 207 of the print server 102 receives terminal position information transmitted from the client terminal 101. This process is executed only when terminal position information is transmitted from the client terminal 101. FIG. 5A illustrates an example of such terminal position information (current position information). The current position information includes a user ID and positional information (latitude, longitude, and altitude or floor number). Based on the received current position information, the control unit 207 updates the current position information in a user management table stored in the storage unit 206. FIG. 5B illustrates an example of the user management table. In the user management table, the user ID, the transmitted current position information, and the print data are associated with one another. The control unit 207 checks the correspondence relationship between the user ID in the transmitted current position information (FIG. 5A) and the user ID in the attribute data of the print data received in step S302, and establishes the association. The process in step S315 is an example of a positional information acquisition process.

Figure 5C:
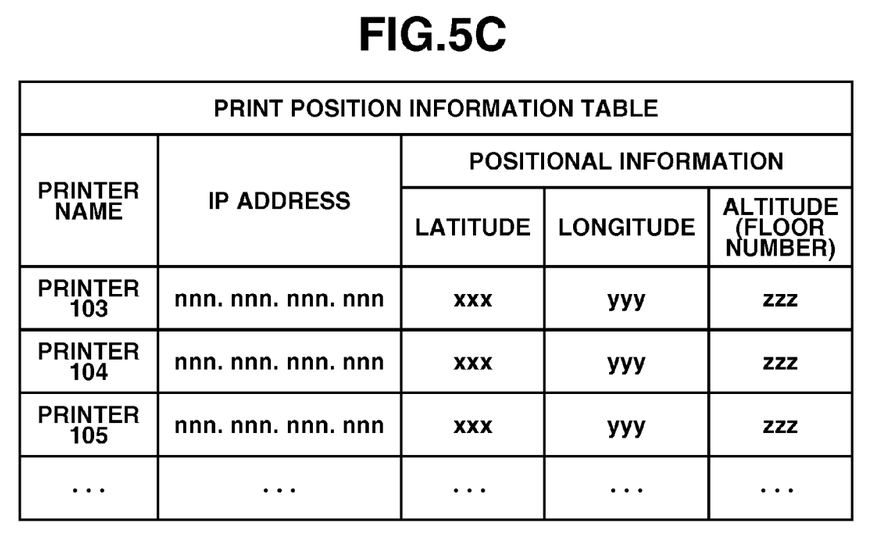

In step S316, the control unit 207 of the print server 102 calculates the distance (distance information) between the client terminal 101 and the printer 103 from their positional information. FIG. 5C illustrates an example of a printer position information table, which is a table for managing the positional information of the printers 103, 104, and 105. The printer position information table is stored in the storage unit 206 of the print server 102. The printer position information table includes the printer names, the IP addresses of the printers, and the positional information (latitude, longitude, and altitude or floor number) of the printers. The information is registered in the printer position information table in advance by a system administrator. The control unit 207 calculates the distance between the client terminal 101 and the printer 103 based on the current position information in the user management table and the printer position information table. The control unit 207 may obtain the distance by using the tables, as described above. Alternatively, without using the tables, the control unit 207 may input, as input values, the positional information of the client terminal 101 and the positional information of the printer 103 into a predetermined formula, function, or the like, and may thus obtain the distance between the client terminal 101 and the printer 103.

In step S317, the control unit 207 of the print server 102 determines whether the distance between the client terminal 101 and the printer 103 calculated in step S316 is greater than a predetermined threshold value. The predetermined threshold value described herein, for example, is approximately 5 m or less and is set in advance by a system administrator. If the control unit 207 determines that the distance between the client terminal 101 and the printer 103 is greater than the threshold value based on the result of the comparison (YES in step S317), the control unit 207 proceeds to step S318. Meanwhile, if the control unit 207 determines that the distance between the client terminal 101 and the printer 103 is less than the threshold value based on the result of the comparison (NO in step S317), the control unit 207 returns to step S310.

In step S318, the control unit 207 of the print server 102 determines whether the print notification flag stored in the storage unit 206 of the print server 102 indicates stop. If the print notification flag indicates stop (YES in step S318), the control unit 207 returns to step S315; and if the print notification flag indicates start (NO in step S318), the control unit 207 proceeds to step S319.

In step S319, the control unit 207 of the print server 102 transmits a print stop notification to the printer 103. In addition, the control unit 207 changes the print notification flag stored in the storage unit 206 of the print server 102 to stop.

In step S320, the control unit 213 of the printer 103 changes the print notification flag stored in the storage unit 210 of the printer 103, based on the received print notification. The state of the print notification flag stored in the storage unit 210 is either start or stop. The initial value of the print notification flag is start.

In step S321, the control unit 213 of the printer 103 checks whether the print notification flag stored in the storage unit 210 of the printer 103 indicates start or stop.

In step S322, the control unit 213 of the printer 103 determines a subsequent process based on the result obtained by checking the print notification in step S321. If the result of checking the print notification indicates start (YES in step S322), the control unit 213 proceeds to step S323; and if the result indicates stop (NO in step S322), the control unit 213 returns to step S312. In this manner, whether printing is actually executed or stopped is determined based on the determination in step S322. At this point, if the control unit 213 determines that printing is to be stopped, the control unit 213 may stop the printing but may execute raster image processing (RIP) and so on and store the result obtained through the RIP into the storage unit 210 or the like. Through this process, when the printing is to be executed, the control unit 213 can immediately acquire the data that has been subjected to the RIP from the storage unit 210 and can execute the printing promptly.

In step S323, the control unit 213 of the printer 103 executes the printing. At this point, the control unit 213 controls the image forming unit 211 to execute the printing.

In step S324, the control unit 213 of the printer 103 transmits a print end notification to the print server 102, and terminates the process. This print end notification is transmitted immediately after printing is executed and is not transmitted when a print output is completed.

In step S325, the control unit 204 of the client terminal 101 changes a position notification flag stored in the storage unit 202 of the client terminal 101 based on the received position start notification. The initial value of the position notification flag is end. If the notification of the start is received, the control unit 204 periodically starts transmitting, from the client terminal 101, the positional information of the client terminal 101 to the print server 102. The interval with which the positional information is periodically transmitted is, for example, one second. The control unit 204 may determine or modify the interval, for example, in accordance with a print application operating on the client terminal 101. In addition, the control unit 204 can change the interval in accordance with a user operation or the like input through the operation display unit 201.

In step S326, the control unit 204 of the client terminal 101 determines a subsequent process based on the result obtained by checking the position notification flag stored in the storage unit 202 of the client terminal 101. If the position notification flag indicates start (YES in step S326), the control unit 204 proceeds to step S327; and if the position notification flag indicates end (NO in step S326), the control unit 204 terminates the process.

In step S327, the control unit 204 of the client terminal 101 controls the position acquisition unit 203 to acquire the positional information of the client terminal 101 and transmits the positional information to the print server 102 (positional information transmission).

In step S328, the control unit 207 of the print server 102 transmits a position end notification to the client terminal 101.

In step S329, the control unit 207 of the print server 102 deletes the print data stored in the storage unit 206 of the print server 102. The control unit 207 deletes the print data as well as the user ID and the current position information in the user management table stored in the storage unit 206 as illustrated in FIG. 5B.

As described thus far, according to the present exemplary embodiment, the control unit 207 calculates the distance between the client terminal 101 and the printer 103 from their positional information, and the start and the stop of print execution of print data output from the printer 103 can be controlled based on the calculated distance. Through this configuration, the print execution is stopped when the user carrying the client terminal 101 moves away from the printer 103 with which the user intended to execute printing. Accordingly, a situation in which a printed material is output while the user is away from the printer 103 does not occur, and thus the security increases. In addition, since the user can stop the print execution simply by moving away from the printer 103, the convenience for the user increases. Although the start and the stop of print execution are controlled based on the positional information of the client terminal 101 that outputs the print data in the present exemplary embodiment, the start and the stop of print execution may be controlled based on the positional information of another client terminal. In this case, a client terminal that acquires the positional information of the user ID in the printing system needs to be registered in the print server 102 and so on.

Figures 6, 6A:
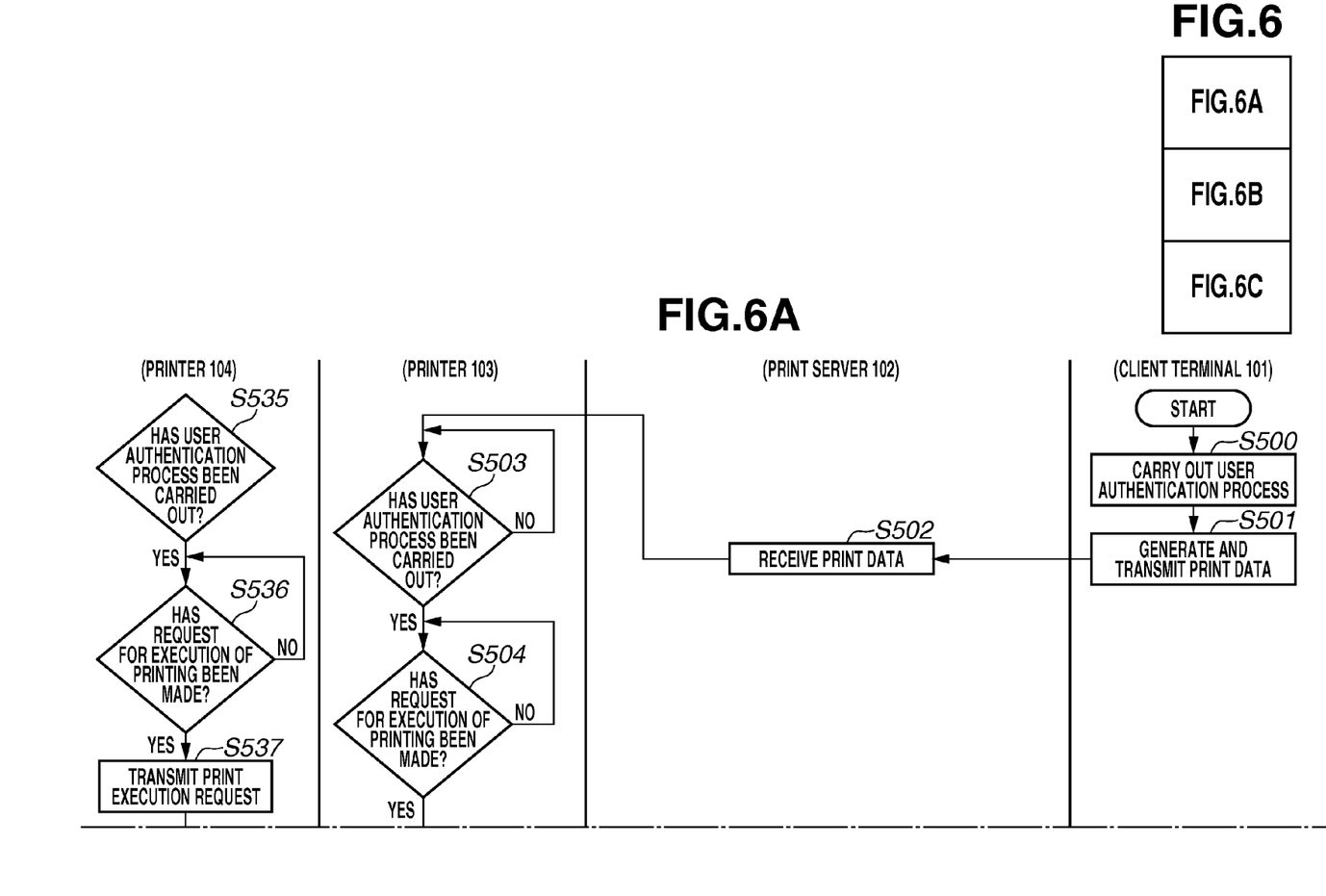
Figure 6B:
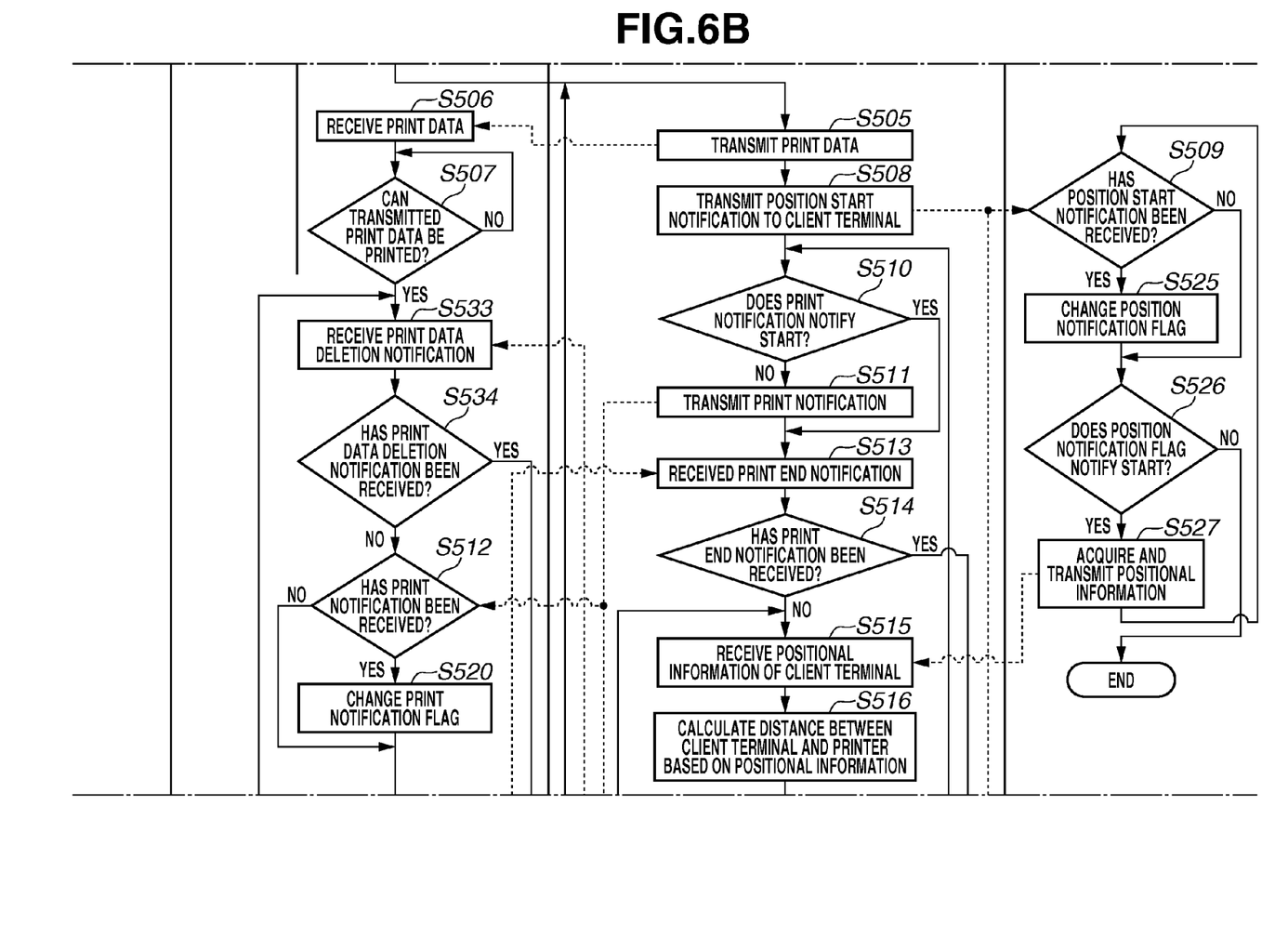
Figure 6C:
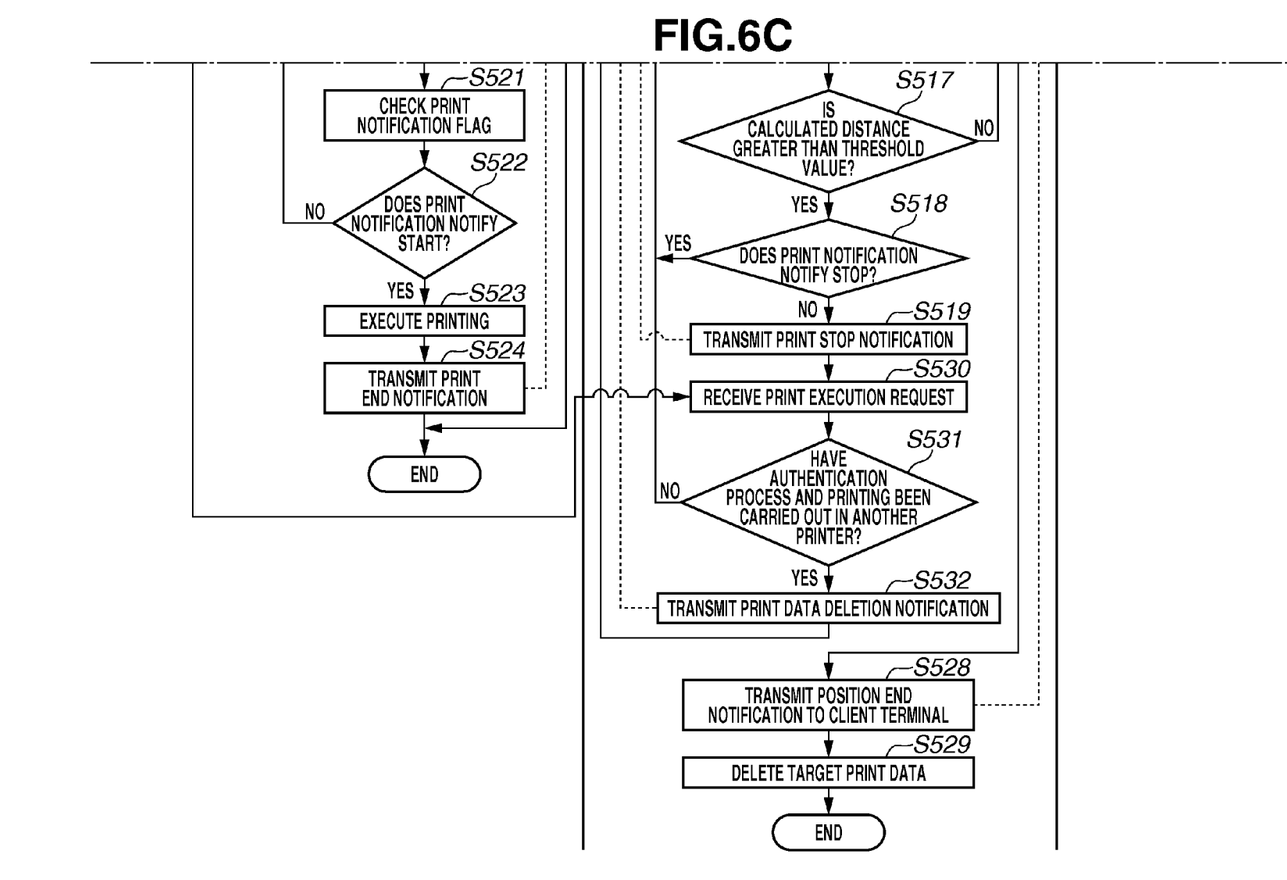

Hereinafter, a second exemplary embodiment will be described. In the processes illustrated in FIG. 3, the distance between the client terminal 101 and the printer 103 is calculated based on the positional information of the client terminal 101 and the printer 103, and the start and the stop of print execution of print data output from the printer 103 are controlled based on the calculated distance. In the second exemplary embodiment, a description is given of processes carried out in a case where the distance is put between the client terminal 101 and the printer 103 and printing is executed by another printer that is different from a printer with which printing has initially been executed. FIG. 6 is a flowchart illustrating exemplary information processing for outputting with another printer. The information processing described here is substantially similar to the information processing according to the first exemplary embodiment illustrated in FIG. 3, and only the differences between them will be primarily described. Referring to FIG. 6, the processing is described on the assumption that the distance is kept between the client terminal 101 and the printer 103 and the print data in the print queue in the printer 103 has been stopped. In other words, this state corresponds to step S319 of FIG. 3, or to step S519 of FIG. 6, and processes thereafter will be described.

In step S530, the control unit 207 of the print server 102 receives a print execution request from the printer 104, which is different from the printer 103. This process is executed only when a print execution request is transmitted from the printer 104.

In step S531, the control unit 207 of the print server 102 determines whether the control unit 207 has received the print execution request from the printer 104, which is different from the printer 103, in step S530. If the control unit 207 has received the print execution request (YES in step S531), the control unit 207 proceeds to step S532; and if the control unit 207 has not received the print execution request (NO in step S531), the control unit 207 returns to step S515.

In step S532, the control unit 207 of the print server 102 transmits a print data deletion notification to the printer 103. The control unit 207 then returns to step S505.

In step S533, the control unit 213 of the printer 103 receives the print data deletion notification from the print server 102. This process is executed only when the print data deletion notification is transmitted from the print server 102.

In step S534, the control unit 213 of the printer 103 determines whether the control unit 213 has received the print data deletion notification in step S533. If the control unit 213 has not received the print data deletion notification (NO in step S534), the control unit 213 proceeds to step S512; and if the control unit 213 has received the print data deletion notification (YES in step S534), the control unit 213 deletes the print data and terminates the process. In this manner, the print data that has been stopped in the printer 103 is deleted.

In step S535, the control unit 213 of the printer 104 determines whether the user has carried out the authentication process. This authentication process is similar to the process described above, and thus descriptions thereof will be omitted.

In step S536, the control unit 213 of the printer 104 determines whether print execution has been requested based on the user operation on the operation display unit 209 of the printer 104.

In step S537, the control unit 213 of the printer 104 transmits a print execution request. The processes in the printer 104 thereafter are similar to those in the printer 103, namely, the processes after step S506 of FIG. 6. Thus, descriptions thereof will be omitted.

As described above, in the present exemplary embodiment, a description is given of the processes carried out when the distance is put between the client terminal 101 and the printer 103 and the printing is executed by a printer that is different from another printer with which the printing has initially been executed. Through this configuration, in a case in which a printer with which the user initially intended to output a document is occupied by another job, the user can output the document from another printer, and thus the convenience for the user increases. At that time, data which the user initially intended to output from a printer but has been stopped can be deleted without any user action, and the convenience for the user increases.

A third exemplary embodiment will be described below. In the processes illustrated in FIG. 3, the distance between the client terminal 101 and the printer 103 is calculated from the positional information of the client terminal 101 and the printer 103, and the start and the stop of print execution of print data to be output from the printer 103 are controlled based on the calculated distance. In the third exemplary embodiment, a description is given of processes carried out when a user who does not carry the client terminal 101 requests authentication and printing to be executed by a printer. In other words, the processes according to the present exemplary embodiment are carried out in a case where the user has submitted a print job through the client terminal 101 but does not carry the client terminal 101 when the user picks up the printed material.

Figure 7:
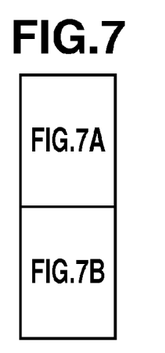
FIG. 7 (including FIGS. 7A and 7B) is a flowchart illustrating exemplary information processing according to a third exemplary embodiment.
Figure 7A:
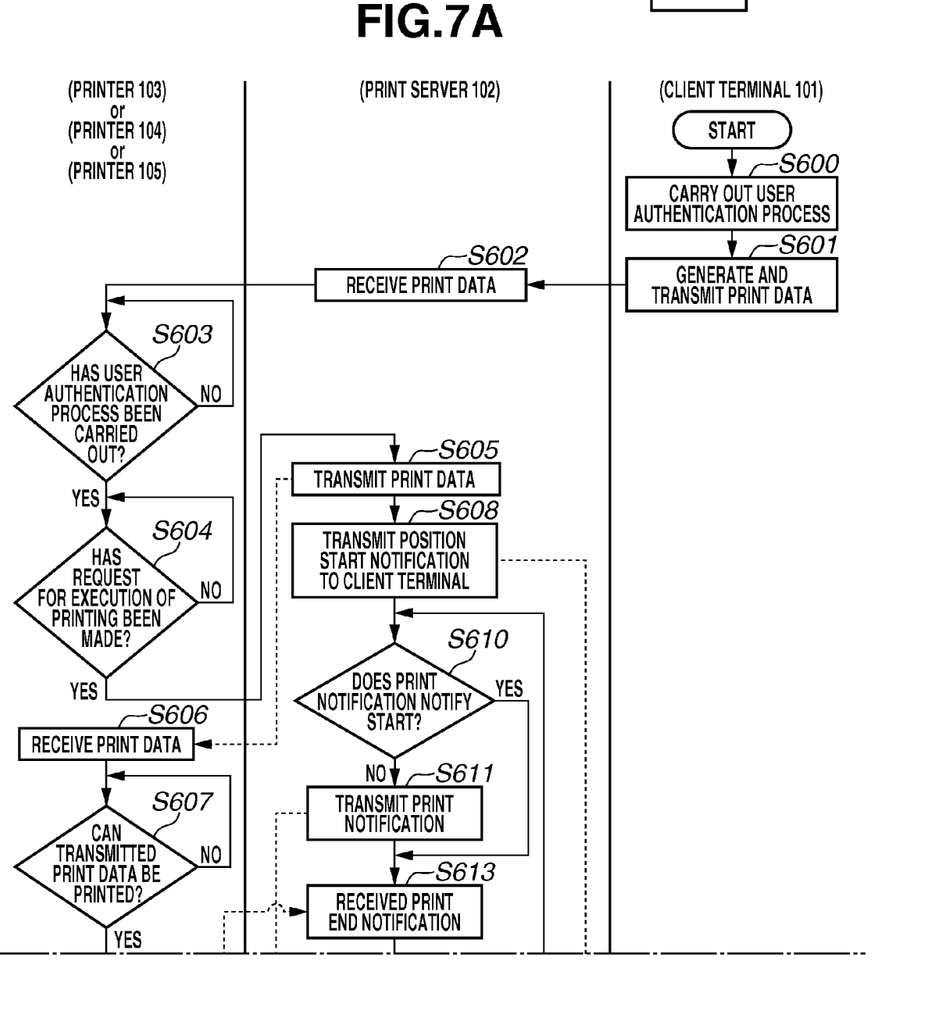
Figure 7B:
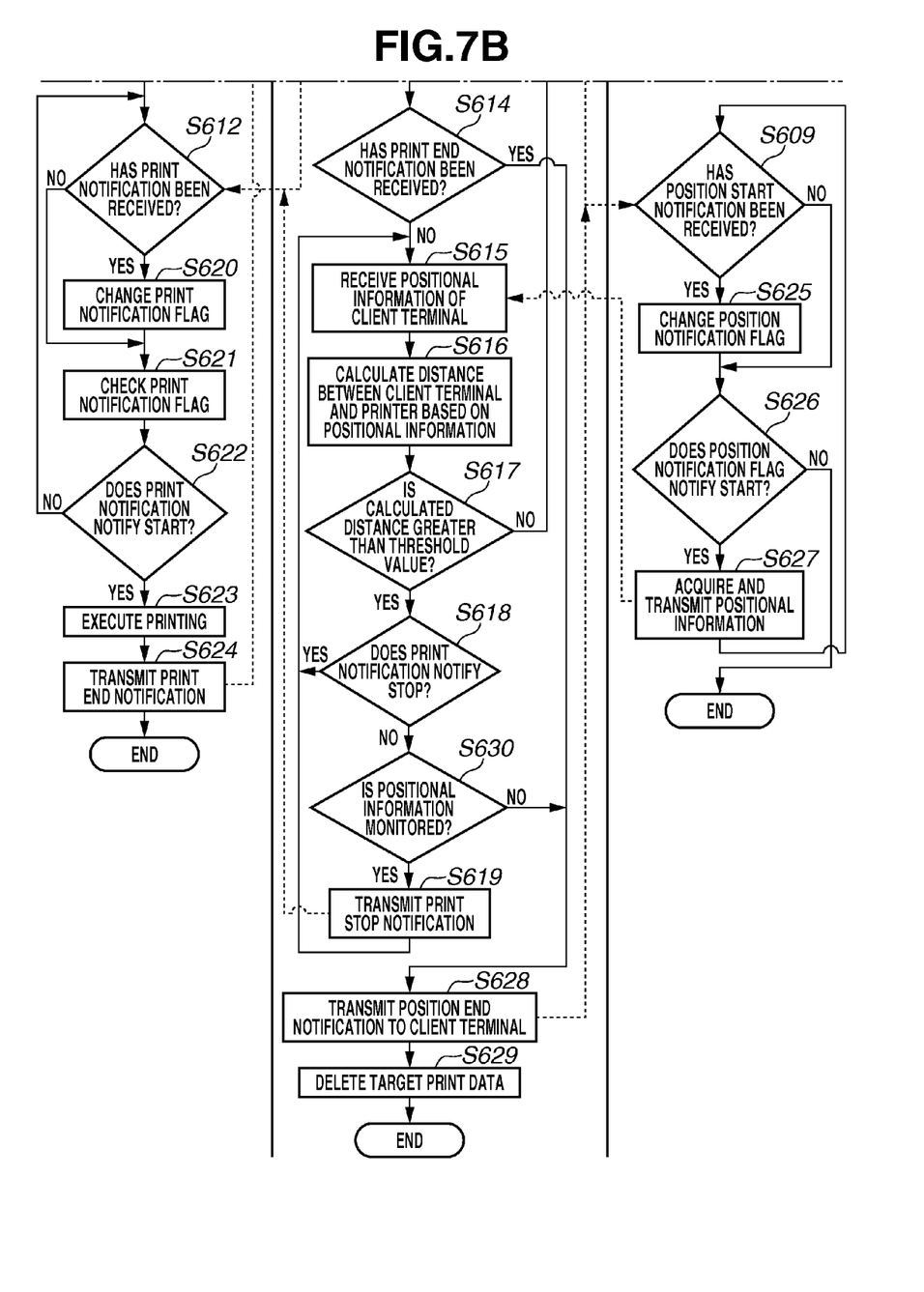

FIG. 7 is a flowchart illustrating exemplary information processing to be carried out when the user does not carry the client terminal at the time of print authentication. The information processing described here is substantially similar to the information processing according to the first exemplary embodiment illustrated in FIG. 3, and only the differences between them will be primarily described. Referring to FIG. 7, the description is given on the assumption that the distance is put between the client terminal 101 and the printer 103 and the print data in the print queue in the printer 103 has been stopped. In other words, this state corresponds to step S318 of FIG. 3, or to step S618 of FIG. 7, and processes after step S618 will be described.

In step S630, the control unit 207 of the print server 102 determines whether the positional information is to be monitored based on the positional information and so on transmitted from the client terminal 101. If the control unit 207 determines that the positional information is not to be monitored (NO in step S630), the control unit 207 proceeds to step S628; and if the control unit 207 determines that the positional information continues to be monitored (YES in step S630), the control unit 207 proceeds to step S619. For example, the control unit 207 of the print server 102 may determine that the user does not carry the client terminal 101 if the positional information of the client terminal 101 is not within a predetermined range from the positional information of the printer 103, at the time when the user authentication process is carried out in the printer 103. If the control unit 207 determines that the user does not carry the client terminal 101, the control unit 207 may determine that the positional information is not to be monitored, in other words, may determine that a process of managing the positional information of the client terminal 101 and controlling the printing of print data is not carried out. In addition, for example, if the control unit 207 can determine that the positional information of the client terminal 101 is not moved from a predetermined position, the control unit 207 may determine that the user does not carry the client terminal 101.

Thus, in the present exemplary embodiment, the description has been given of the processes which are carried out when the user who does not carry the client terminal 101, requests authentication and execution of the printing by a printer. Through this configuration, for example, even when the user forgets to carry the client terminal 101 when the user is to execute printing, the printing can be executed normally without causing the user any trouble, and the convenience for the user increases.

In a case in which the user explicitly wants to disable the positional information notification, for example, the control unit 204 of the client terminal 101 may carry out the following process. Specifically, the control unit 204 may append an attribute indicating that a positional information service is not carried out when the client terminal 101 transmits the print data in step S601 in accordance with a selecting operation of the user through the operation display unit 201 or the like. The print server 102, upon receiving the print data to which the aforementioned attribute is appended, disables the process pertaining to the positional information notification as indicated in the exemplary embodiment described above.

In this manner, according to the exemplary embodiments described above, the security of a printed material left unattended can be increased without causing a user any trouble.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-080428 filed Apr. 9, 2014, which is hereby incorporated by reference herein in its Entirety.

What is claimed is:

1. A print server apparatus, comprising:
    a first receiving unit configured to receive print data from a portable device;
    a first transmitting unit configured to transmit the print data to a printing device;
    a second receiving unit configured to receive positional information of the portable device from the portable device;
    a calculation unit configured to calculate a distance between the printing device and the portable device based on the positional information;
    a determination unit configured to determine whether the distance is less than a threshold value; and
    a second transmitting unit configured to transmit a print notification to the printer based on a result of a determination that the distance is less than the threshold value, the print notification indicating that printing of the print data is to be started by the printing device.

2. The server apparatus according to claim 1, further comprising a third transmitting unit configured to transmit a print data deletion notification indicting that the printing device of deletion of the print data in a case in which a print execution request is received from a second printing device that is different from the printing device recited in claim 1.

3. The server apparatus according to claim 1, further comprising:
    a management unit configured to manage the positional information of the printing device,
    wherein the calculation unit calculates the distance based on the positional information of the printing device managed by the management unit and the positional information of the portable device.

4. The server apparatus according to claim 1, wherein the second transmitting unit transmits a print stop notification to the printing device based on a result of a determination that that distance is greater than the threshold value, the print stop notification indicating that printing of the print data is to be stopped.

5. A printing system, comprising:
    a printing device;
    a portable device; and
    a print server apparatus,
    wherein the print server apparatus includes:
    a first receiving unit configured to receive print data from the portable device;
    a first transmitting unit configured to transmit the print data to the printing device;
    a second receiving unit configured to receive positional information of the portable device from the portable device;
    a calculation unit configured to calculate a distance between the printing device and the portable device based on the positional information;
    a determination unit configured to determine whether the distance is less than a threshold value; and
    a second transmitting unit configured to transmit a print notification to the printer based on a result of a determination that the distance is less than the threshold value, the print notification indicating that printing of the print data is to be started by the printing device.

6. The printing system according to claim 5,
    wherein the portable device includes
    a positional information acquisition unit configured to acquire positional information, and
    a positional information transmission unit configured to transmit the positional information,
    wherein the print server apparatus further includes
    a management unit configured to manage the positional information of the printing device, and
    wherein the calculation unit calculates the distance based on the
    positional information of the printing device managed by the management unit and the positional information of the portable device.

7. An information processing method, the information processing method comprising:
    receiving print data from a portable device;
    transmitting the print data to a printing device;
    receiving positional information of the portable device from the portable device;
    calculating a distance between the printing device and the portable device based on the positional information;
    determining whether the distance is less than a threshold value; and
    transmitting a print notification to the printer based on a result of a determination that the distance is less than the threshold value, the print notification indicating that printing of the print data is to be started by the printing device.

8. A non-transitory computer readable storage medium storing computer executable instructions that cause a computer to execute a method, the method comprising:
    receiving print data from a portable device;
    transmitting the print data to a printing device;

receiving positional information of the portable device from the portable device;

calculating a distance between the printing device and the portable device based on the positional information;

determining whether the distance is less than a threshold value; and transmitting a print notification to the printer based on a result of a determination that the distance is less than the threshold value, the print notification indicating that printing of the print data is to be started by the printing device.

* * * * *